US007701680B2

(12) United States Patent
Li et al.

(10) Patent No.: US 7,701,680 B2
(45) Date of Patent: Apr. 20, 2010

(54) GROUND-FAULT CIRCUIT INTERRUPTER

(75) Inventors: Chengli Li, Shanghai (CN); Long Zhang, Shanghai (CN)

(73) Assignee: Shanghai ELE Manufacturing Co., Ltd, Shanghai (CN)

( * ) Notice: Subject to any disclaimer, the term of this patent is extended or adjusted under 35 U.S.C. 154(b) by 286 days.

(21) Appl. No.: 11/758,132

(22) Filed: Jun. 5, 2007

(65) Prior Publication Data

US 2008/0112099 A1 May 15, 2008

(51) Int. Cl.
*H02H 3/00* (2006.01)

(52) U.S. Cl. .......................................... 361/45; 361/42

(58) Field of Classification Search .................. 361/42, 361/45

See application file for complete search history.

(56) References Cited

U.S. PATENT DOCUMENTS

| | | | |
|---|---|---|---|
| 3,766,434 | A | 10/1973 | Sherman |
| 4,051,544 | A | 9/1977 | Vibert |
| 4,159,499 | A | 6/1979 | Bereskin |
| 4,421,959 | A | 12/1983 | Chen et al. |
| 4,442,470 | A | 4/1984 | Misencik |
| 4,595,894 | A | 6/1986 | Doyle et al. |
| 4,616,117 | A | 10/1986 | Kleine |
| 4,618,907 | A | 10/1986 | Leopold |
| 5,418,678 | A | 5/1995 | McDonald |
| 5,546,266 | A | 8/1996 | MacKenzie et al. |
| 5,594,398 | A | 1/1997 | Marcou et al. |
| 5,600,524 | A | 2/1997 | Neiger et al. |
| 5,831,395 | A | 11/1998 | Mortimer et al. |
| 6,040,967 | A | 3/2000 | DiSalvo |
| 6,246,558 | B1 | 6/2001 | DiSalvo et al. |
| 6,282,070 | B1 | 8/2001 | Ziegler et al. |
| 6,381,112 | B1 | 4/2002 | DiSalvo |
| 6,437,953 | B2 | 8/2002 | DiSalvo et al. |
| 6,646,838 | B2 | 11/2003 | Ziegler et al. |
| 6,657,834 | B2 | 12/2003 | DiSalvo |
| 6,671,145 | B2 | 12/2003 | Germain et al. |
| 6,693,779 | B2 | 2/2004 | DiSalvo |
| 6,717,782 | B2 | 4/2004 | DiSalvo et al. |
| 6,720,872 | B1 | 4/2004 | Engel et al. |
| 6,734,769 | B1 | 5/2004 | Germain et al. |
| 6,771,152 | B2 | 8/2004 | Germain et al. |
| 6,813,126 | B2 | 11/2004 | DiSalvo et al. |
| 6,828,886 | B2 | 12/2004 | Germain et al. |
| 6,864,766 | B2 | 3/2005 | DiSalvo et al. |
| 6,864,769 | B2 | 3/2005 | Germain et al. |
| 6,873,231 | B2 | 3/2005 | Germain et al. |
| 6,900,972 | B1 | 5/2005 | Chan et al. |

(Continued)

*Primary Examiner*—Jared J Fureman
*Assistant Examiner*—Christopher J Clark
(74) *Attorney, Agent, or Firm*—Chen Yoshimura LLP

(57) ABSTRACT

An improved ground-fault circuit interrupter (GFCI) device has a moveable lock plate controlled by a relay to block a hole under the reset guiding member to prevent reset of the device. The moveable lock plate blocks the hole and prevents reset when the relay is not energized, and expose the hole to allow reset when the relay is energized. The relay is powered by a power supply circuit which is connected in series with a solenoid across the input side of the GFCI. The solenoid is controlled by a control circuit, and causes a disconnecting assembly to disconnect the input and output sides of the GFCI when a leakage current is detected. If the solenoid malfunctions, or if the GFCI device is reversely wired, the relay is not energized and the device cannot be reset.

5 Claims, 10 Drawing Sheets

U.S. PATENT DOCUMENTS 6,937,451 B2 8/2005 Ulrich et al.
6,944,001 B2 9/2005 Ziegler et al.
6,954,125 B2 10/2005 Wu et al.
6,975,192 B2 12/2005 Disalvo
6,975,492 B2 12/2005 DiSalvo
6,982,856 B2 1/2006 Bernstein
7,009,473 B2 * 3/2006 Zhang .......................... 335/6
7,031,125 B2 4/2006 Germain et al.
7,042,688 B2 5/2006 Chan et al.
7,049,910 B2 5/2006 Campolo et al.
7,088,205 B2 8/2006 Germain et al.
7,098,761 B2 8/2006 Germain et al.
7,154,718 B1 12/2006 Finlay, Sr. et al.
7,164,564 B1 1/2007 Finlay, Sr. et al.
7,173,799 B1 2/2007 Weeks et al.
7,184,250 B2 * 2/2007 Bonilla et al. ................ 361/42
7,195,500 B2 3/2007 Huang et al.
7,212,386 B1 5/2007 Finlay, Sr. et al.
7,227,435 B2 6/2007 Germain et al.
7,253,629 B1 * 8/2007 Richards et al. ............ 324/424
7,256,973 B1 8/2007 Radosavljevic et al.
7,265,956 B2 9/2007 Huang
7,271,987 B1 9/2007 Zhang et al.
7,289,306 B2 10/2007 Huang et al.
7,295,415 B2 11/2007 Huang et al.
7,315,437 B2 * 1/2008 Bonilla et al. ................ 361/42
7,443,309 B2 * 10/2008 Baldwin et al. ............ 340/650
7,492,558 B2 * 2/2009 Germain et al. .............. 361/42
7,498,909 B2 * 3/2009 Zhang et al. ................. 335/18
7,525,441 B2 4/2009 Zhang et al.
7,612,973 B2 * 11/2009 Germain ...................... 361/42
2004/0021996 A1 2/2004 Wu et al.
2004/0027740 A1 2/2004 Huang et al.
2004/0037018 A1 * 2/2004 Kim ............................ 361/42
2004/0070897 A1 * 4/2004 Wu et al. ...................... 361/42
2005/0264383 A1 12/2005 Zhang
2006/0139132 A1 * 6/2006 Porter et al. ................. 335/18
2008/0186642 A1 * 8/2008 Campolo et al. ............. 361/42
2009/0147418 A1 * 6/2009 Li et al. ........................ 361/45

* cited by examiner

GROUND-FAULT CIRCUIT INTERRUPTER

This application claims foreign priority benefits under 35 U.S.C. §119(a)-(d) from China Patent Application No. 200620158464.6, filed Nov. 14, 2006, which is incorporated by reference in its entirety.

BACKGROUND OF THE INVENTION

1. Field of the Invention

The present invention relates to leakage current protection devices, and more particularly relates to improved ground-fault circuit interrupters with a reverse wiring protection function.

2. Description of the Related Art

A receptacle type ground-fault circuit interrupter (GFCI) device with reverse wiring protection is described in commonly owned U.S. Pat. No. 7,009,473, issued Mar. 7, 2006, which is incorporated by reference herein in its entirety. This device provides both leakage current protection and reverse wiring protection that protects against incorrect wiring during installation. Such a GFCI receptacle has a pair of input terminals for connecting to power lines, a pair of output terminals for connecting to a load, and one or more insertion outlets on a faceplate of the receptacle each for receiving the prongs of a plug. When installing the GFCI receptacle in the wall, if the power lines from the wall are incorrectly connected to the output (load) side of the receptacle, the GFCI device effectively cuts off power output at the input side of the receptacle. An improved receptacle type GFCI device with reverse wiring protection is described in commonly owned U.S. patent application Ser. No. 11/484,506, filed Jul. 10, 2006, now pending, which is incorporated by reference herein in its entirety. In this improved GFCI device, if the power lines are incorrectly connected to the load side of the receptacle during installation, power output to both the input side of the receptacle and the insertion outlets on the faceplate is prevented. The GFCI receptacle includes two stationary terminals on two first output conductors electrically connected to the insertion outlet, two stationary terminals on two second output conductors adapted for electrically connecting to the load, and four moveable terminal on two moveable connector arm adapted for electrically connecting to the power lines. The four moveable terminals correspond in position to the four stationary terminals, respectively, and operate to electrical connect or disconnect the power lines to and from the load and the insertion outlet in a manner controlled by a disconnecting mechanism assembly and a reverse wiring protection mechanism.

SUMMARY OF THE INVENTION

The present invention is directed to a GFCI device that is an improvement of the GFCI device described in commonly owned U.S. Pat. No. 7,009,473 and U.S. patent application Ser. No. 11/484,506.

An object of the present invention is to provide a GFCI receptacle device with reverse wiring protection function, and can prevent electrical connection between the input and output sides when the disconnecting solenoid is not properly functioning.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an improved ground-fault circuit interrupter (GFCI) device, which includes: input conductors adapted to be electrically connected to hot and neutral power lines; output conductors adapted to be electrically connected to hot and neutral load lines; output metal plates adapted for receiving prongs of a plug; a disconnecting assembly for electrically connecting the input conductors to the output conductors and the output metal plates when in a connected state, and electrically disconnecting the input conductors from the output conductors and the output metal plates when in a disconnected state; a solenoid which, when triggered, causes the disconnecting assembly to move from the connected state to the disconnected state; a detector coil for detecting a leakage current on the input conductors; a control circuit electrically coupled to the detector coil and the solenoid for triggering the solenoid when a leakage current is detected; a power supply circuit connected in series with the solenoid between the input conductors; a relay connected to the power supply circuit, the relay being energized when the power supply circuit has a current passing through it; a moveable lock plate coupled to the relay, the moveable lock plate being moveable between a locking position when the relay is not energized and an unlocking position when the relay is energized; and a reset mechanism coupled to the disconnecting assembly for resetting the GFCI device, the reset mechanism including a reset button and a vertically movable reset guiding member coupled to the reset button, wherein when the reset guiding member moves down and then up, it engages with the disconnecting assembly to cause the disconnecting assembly to be in the connected state, and wherein the moveable lock plate prevents the reset guiding member from moving down when the moveable lock plate is in the locking position.

The improved ground-fault circuit interrupter device further includes a fist pair of stationary contact terminals electrically connected to the input conductors; a second pair of stationary contact terminals electrically connected to the output metal plates; and a first pair and a second pair of moveable contact terminals electrically connected to the output conductors, wherein the disconnecting assembly moves the first and second pairs of moveable contact terminals to be in contact with the first and second pairs of stationary contact terminals, respectively, in the connected state and moves the first and second pairs of moveable contact terminals to break contact with the first and second pairs of stationary contact terminals, respectively, in the disconnected state.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
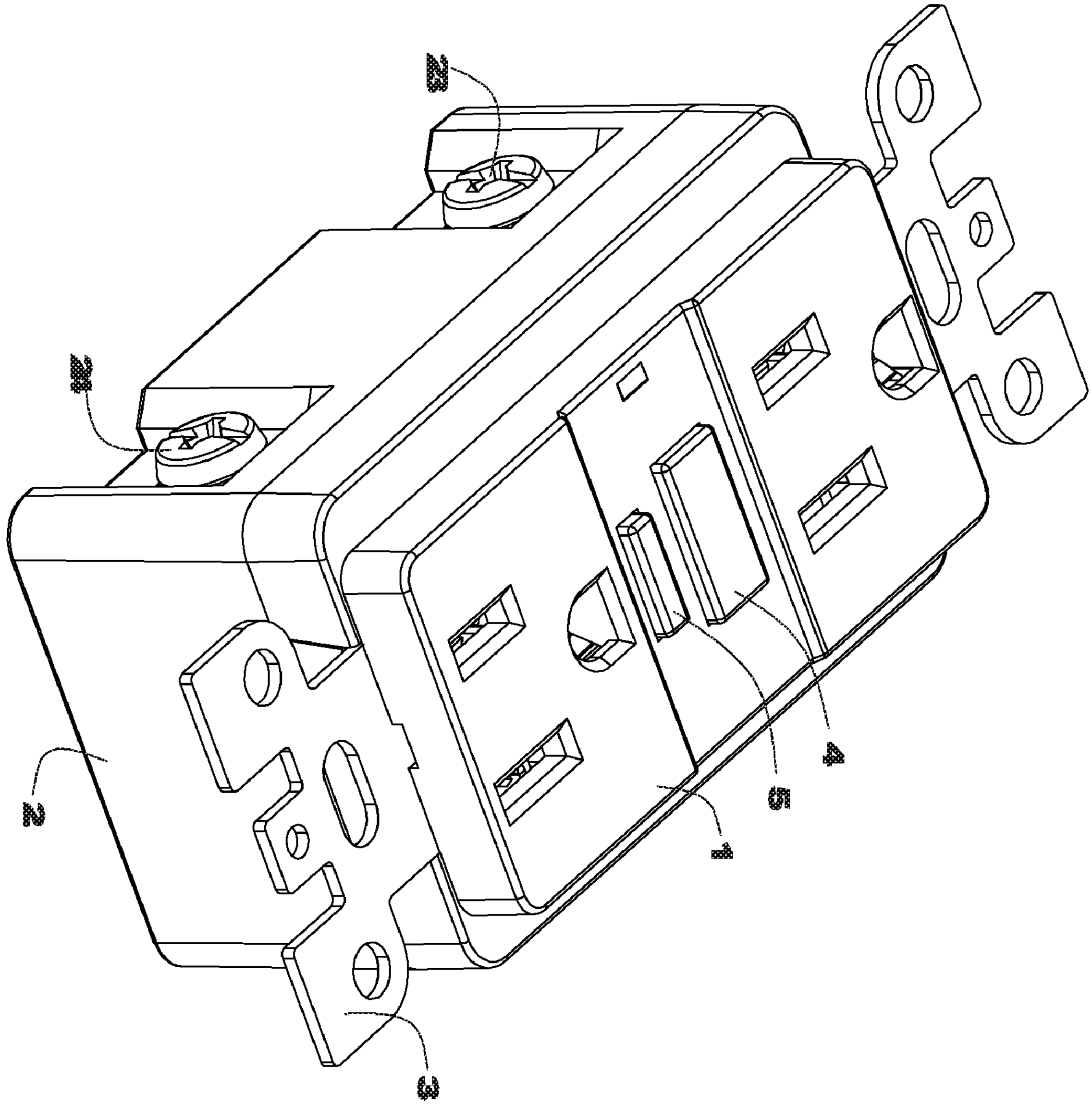
FIG. 1 is an exterior perspective view of a GFCI receptacle device according to an embodiment of the present invention.
Figure 2:
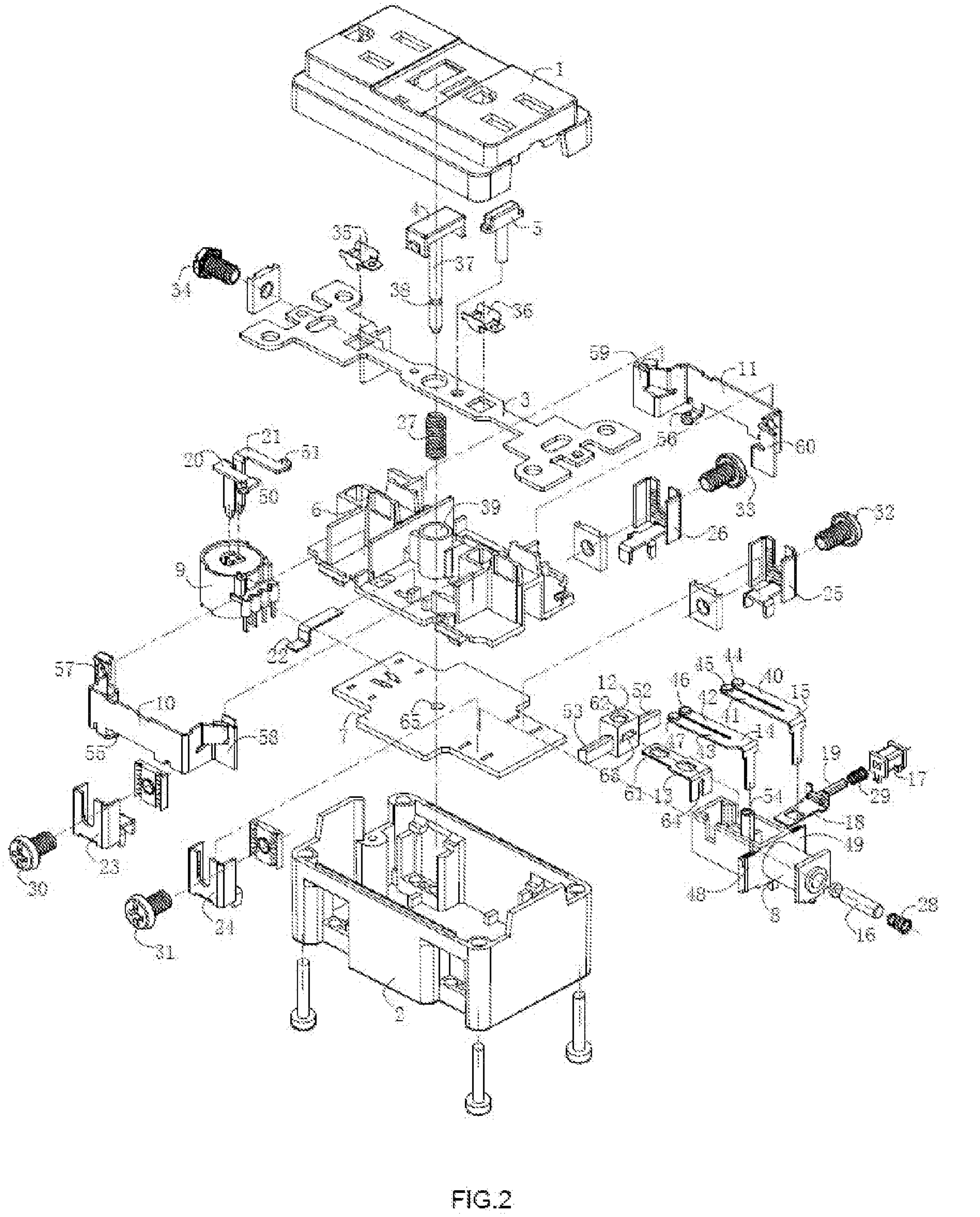
FIG. 2 is an exploded view showing the structure of the GFCI receptacle.
Figure 3:
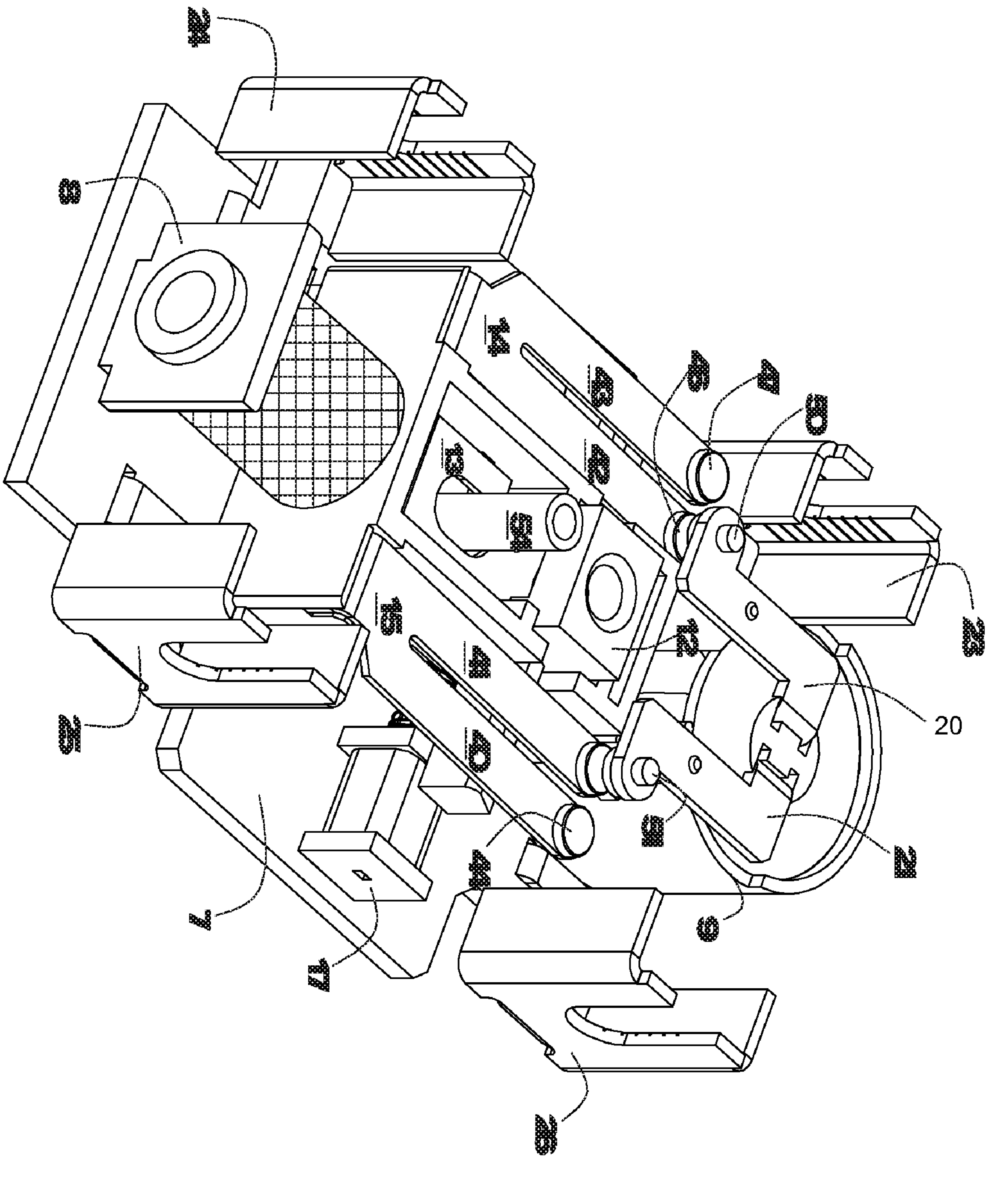
FIG. 3 is a perspective view of the GFCI receptacle in a partially assembled state.

As shown in FIGS. 1-3, a GFCI receptacle according to an embodiment of the present invention includes a body and the following components disposed within the body: input conductors electrically coupled to input screws, output conductors, output metal plates electrically coupled to output screws for receiving prongs of a plug, a detector coil for detecting a leakage current, a disconnecting assembly for electrically connecting and disconnecting the input side and the output side, and a circuit board having a control circuit.

As shown in FIG. 1, the body includes a cover 1 and a base 2. The cover 1 has a three-phase power outlet, a reset button 4 and a test button 5. The reset button 4 and test button 5 pass through the cover 1 to couple to components inside the body. A pair of input screws 30, 33 and a pair of output screws 31, 32 are provided on the side of the base 2.

As shown in FIG. 2, an insulating support frame 6 is disposed inside the body, and a metal grounding plate 3 is disposed between the cover 1 and the insulating support frame 6. The grounding plate 3 is connected to the ground via conductors and a grounding screw 34. A circuit board 7 is disposed between the support frame 6 and the base 2.

As shown in the figures, on both sides of the support frame 6 are hot output conductor 10 and neutral output conductor 11. On the output conductors 10 and 11 and corresponding to the outlet holes are metal insertion plates 57, 58, 59 and 60. A stationary contact terminal 55 is provided on the hot output conductor 10 and a stationary contact terminal 56 is provided on the neutral output conductor 11.

As shown in FIGS. 2 and 3, provided on the circuit board 7 are input conductors 20, 21, detector coil 9, moveable elastic output metal plates 14, 15, and a disconnecting assembly for connecting and disconnecting the input side and the output side of the GFCI receptacle.

One end of the input conductors 20, 21 pass through the detector coil 9 to be soldered together with metal connectors 23, 26 on the circuit board 7, and are electrically connected to the hot and neutral input screws 30, 33 via conductors. The other end of the input conductors 20, 21 are provided with stationary contact terminals 50, 51.

The moveable elastic output metal plates 14, 15 are provided on the two sides of the circuit board 7. One end of the moveable elastic output metal plate 14 is soldered together with metal connectors 24 on the circuit board 7, and is electrically connected to the hot output screws 31. The other end of the moveable elastic output metal plate 14 forks into two moveable contact arms 43, 42 with moveable contact terminals 46, 47, respectively. The moveable contact terminal 46 corresponds in position to the stationary contact terminal 50 of the input conductor 20 to form a switch that can be opened or closed; the moveable contact terminal 47 corresponds in position to the stationary contact terminal 55 of the input conductor 10 to form another switch that can be opened or closed. Similarly, one end of the moveable elastic output metal plate 15 is soldered together with a metal connector 25 on the circuit board 7, and is electrically connected to the neutral output screws 32. The other end of the moveable elastic output metal plate 15 forks into two moveable contact arms 41, 40 with moveable contact terminals 45, 44, respectively. The moveable contact terminal 45 corresponds in position to the stationary contact terminal 51 of the input conductor 21 to form a switch that can be opened or closed; the moveable contact terminal 44 corresponds in position to the stationary contact terminal 56 of the input conductor 11 to form another switch that can be opened or closed.

Between the input conductors 20, 21 and the moveable elastic output metal plates 14, 15, a disconnecting assembly for connecting and disconnecting the input side and output side of the GFCI device is provided. The disconnecting assembly includes a disconnecting member 12, an L-shaped lock member 13, and a disconnecting coil (solenoid) 8 with a plunger 16.

The disconnecting member 12 has a cylindrical shape with a though hole 62 and two side arms 53, 52 extending outward. The moveable elastic output metal plates 14, 15 are located above the side arms 53, 52, respectively, and move up and down with the disconnecting member 12. A cylindrical reset guiding member 37 is disposed inside the though hole 62 of the disconnecting member 12 (see FIG. 2), and passes through the support frame 6 and metal grounding plate 3 to reach the underside of the reset button 4. The lower end of the guiding member 37 is cone-shaped, and has a circular groove 38 above the cone-shaped end. The upper end of the guiding member 37 is coupled to the reset button 4 and can move up and down with it. A reset spring 27 is disposed around the reset guiding member 37.

The disconnecting member 12 also has lateral hole 63, where the top portion of the L-shaped lock member 13 is slideably disposed in the lateral hole 63. Two holes 61 are provided on the top portion of the L-shaped lock member 13, and a U-shaped slot 64 is provided on the side portion of the L-shaped lock member 13 to engage a circular groove located at the front end of the plunger 16. The plunger is disposed inside the disconnecting coil 8, and a disconnecting spring 28 is disposed between the rear end of the plunger 16 and the disconnecting coil 8.

The two ends of the disconnecting coil 8 are connected via the control circuit on the circuit board across the input side hot and neutral lines of the GFCI device. When a current flows through the disconnecting coil 8, a magnetic field is generated which causes the plunger 16 to move. The plunger 16 pushes the L-shaped lock member 13 coupled thereto to slide within the disconnecting member 12. As a result, the reset guiding member 37 moves vertically in the though hole 62 of the disconnecting member 12, bringing the disconnecting member 12 to move vertically, so that the moveable contact terminals 46, 45 on the moveable elastic output metal plates 14, 15 located above the side arms 53, 52 are brought into contact with the stationary contact terminals 50, 51 on the input conductors 20, 21, and the moveable contact terminals 47, 44 are brought into contact with the stationary contact terminals 55, 56 on the output conductors 10, 11. The input side and output side of the GFCI device are therefore electrically connected.

Figure 5:
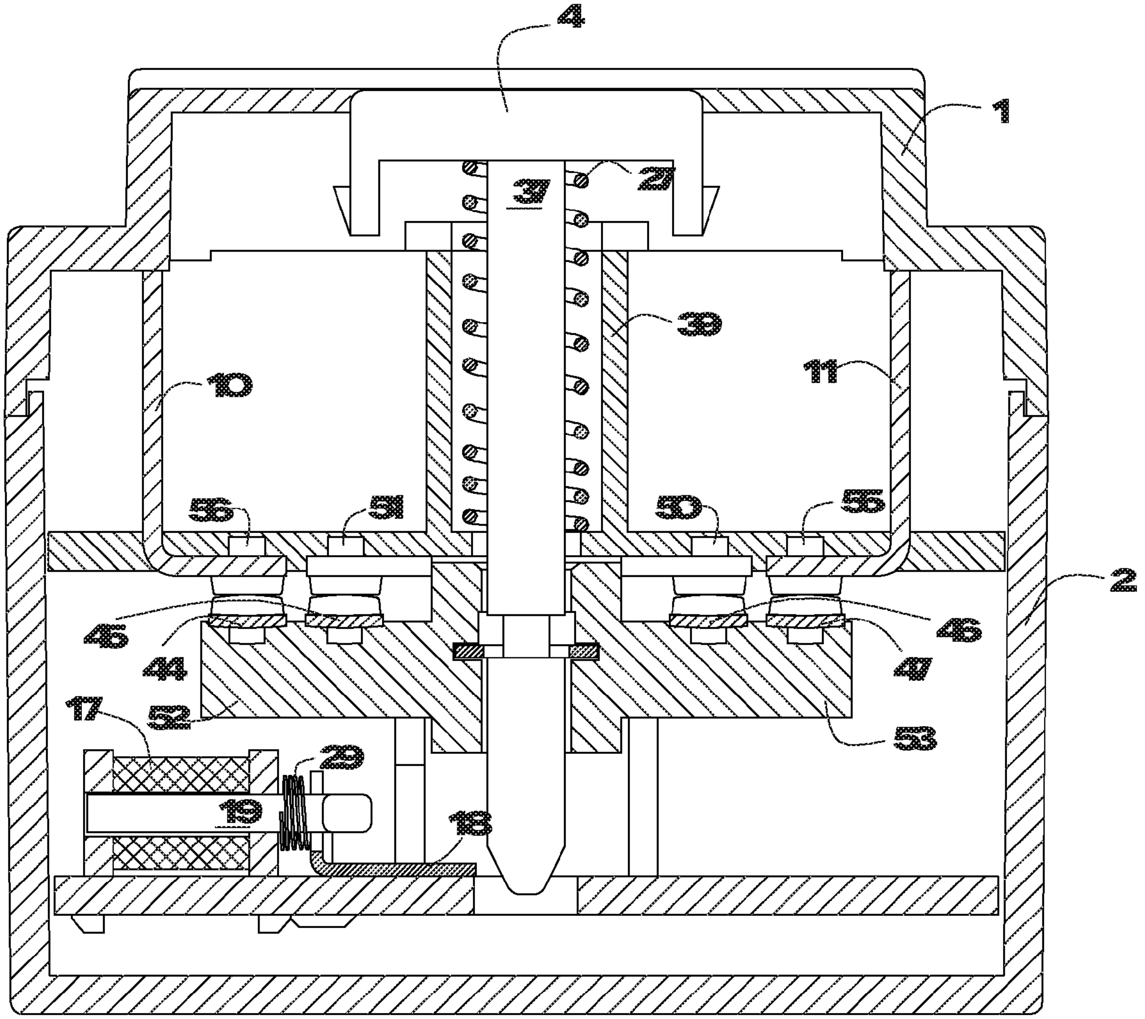
Figure 6:
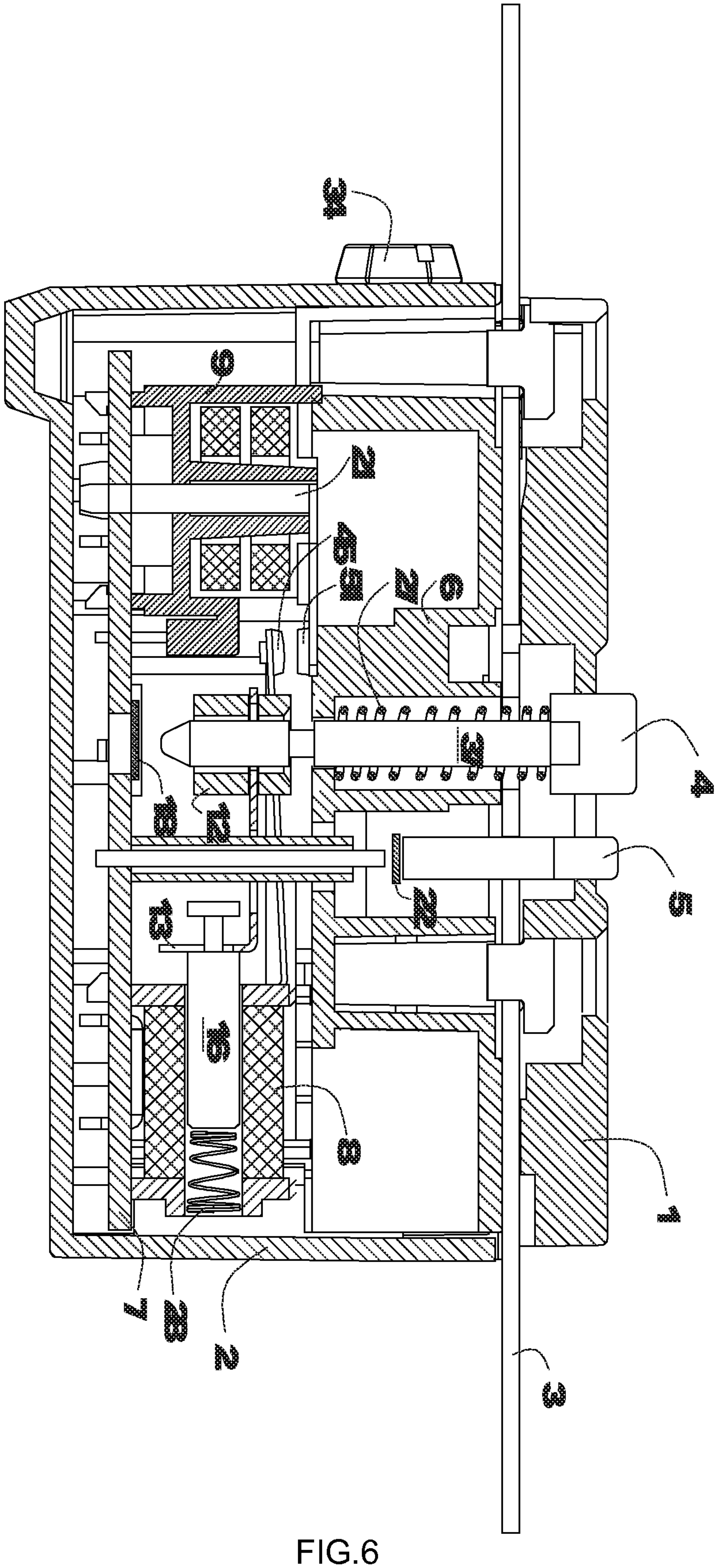
FIGS. 6 and 7 are cross-sectional views illustrating the GFCI receptacle in a disconnected condition when reverse wired or when the solenoid is not properly functioning, where the input side and the output side are electrically disconnected.
Figure 7:
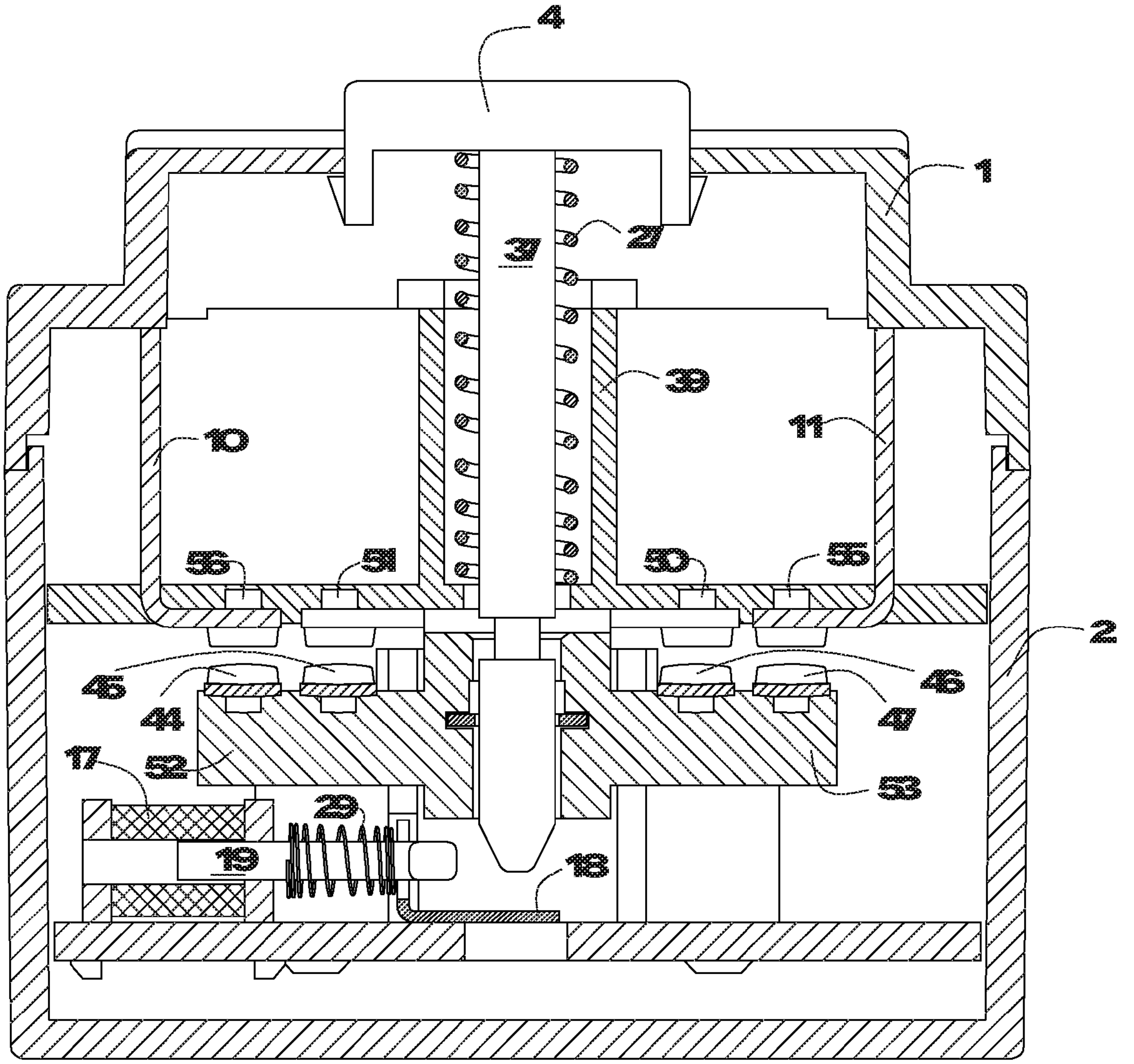

To prevent reverse wiring mistake, and to electrically disconnect the input side and the output side in the event of abnormal conditions in the disconnecting solenoid, a relay assembly is provided as shown in FIGS. 2 and 5. The relay assembly includes a relay coil 17, a relay plunger 19, a moveable lock plate 18 and a spring 29. The relay plunger 19 is disposed inside the relay coil 17, and its front end is coupled to the moveable lock plate 18 to move it. The spring 29 is disposed between the relay coil 17 and the relay plunger 19. On the circuit board 7, a hole 65 is provided below the reset guiding member 37 as shown in FIG. 7. Before the GFCI is installed, the hole 65 is initially covered by the moveable lock plate 18. During installation, when the input side and output side of the GFCI are correctly wired and the disconnecting solenoid and other components of the GFCI device are functioning normally, the relay coil 17 is energized, generating a magnetic field to drive the relay plunger 19. Thus, the moveable lock plate 18 is moved by the relay plunger 19 to expose the hole 65. When the hole 65 is exposed, the reset guiding member 37 can be moved vertically inside the though hole 62 of the disconnecting member 12. The vertical movement of the reset guiding member 37 is necessary to allow the reset button 4 to be pressed down. To reset the device, the reset button 4 is pressed down and then released. The reset guiding member 37 brings the disconnecting member 12 upwards (as the groove 38 engages the edge of the hole 61 of the L-shaped lock member 13 when the reset button is pressed down), causing the moveable contact terminals 46, 45, 47, 44 to contact the stationary contact terminals 50, 51, 55, 56, respectively. As a result, the input side and output side of the GFCI device are electrically connected. The hole 65 remains exposed and the GFCI device can be repeatedly reset after trips as long as all components of the control circuit function properly.

Figure 8:
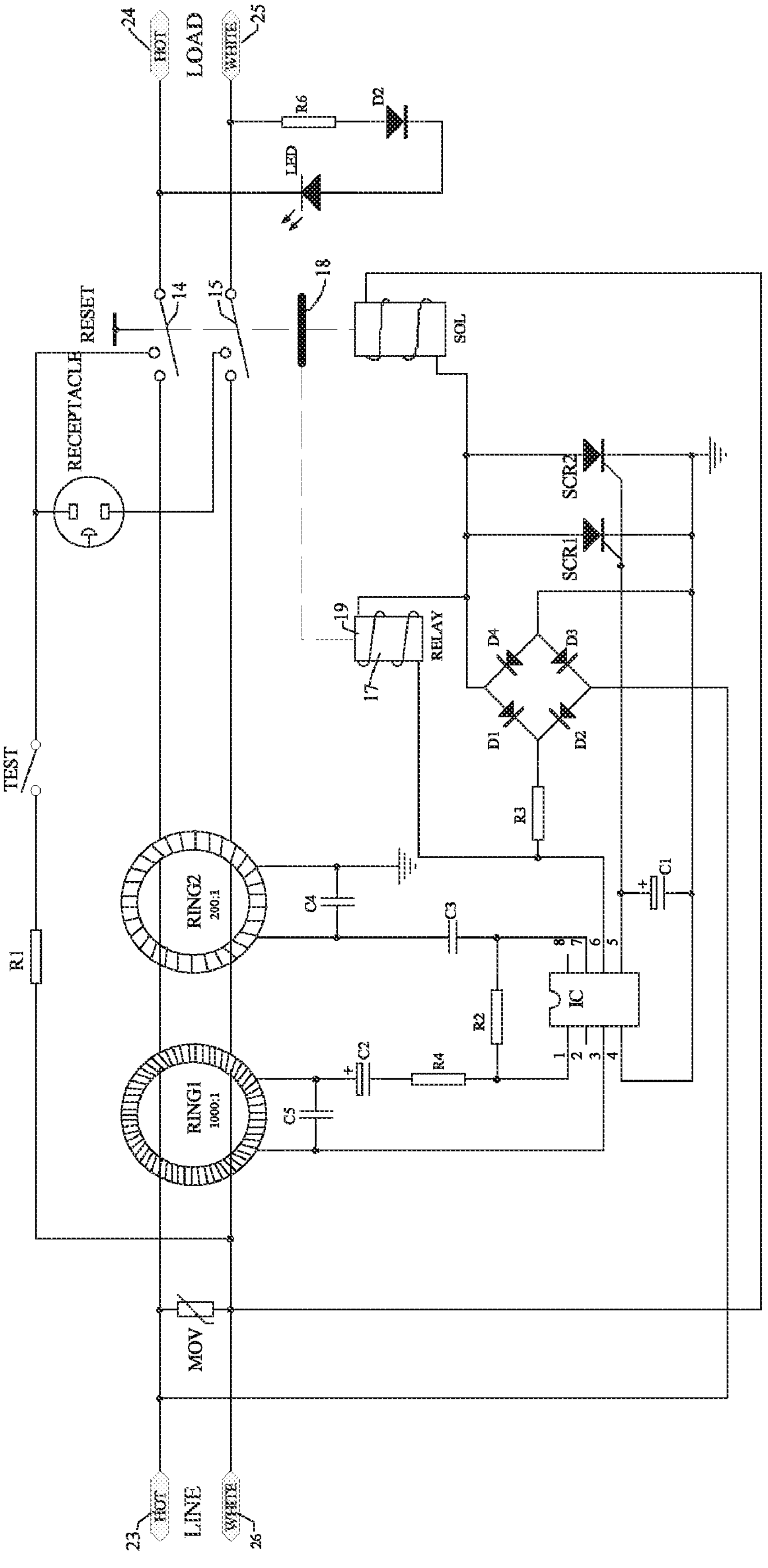
FIG. 8 is a circuit diagram of a GFCI receptacle according to an embodiment of the present invention.
Figure 9:
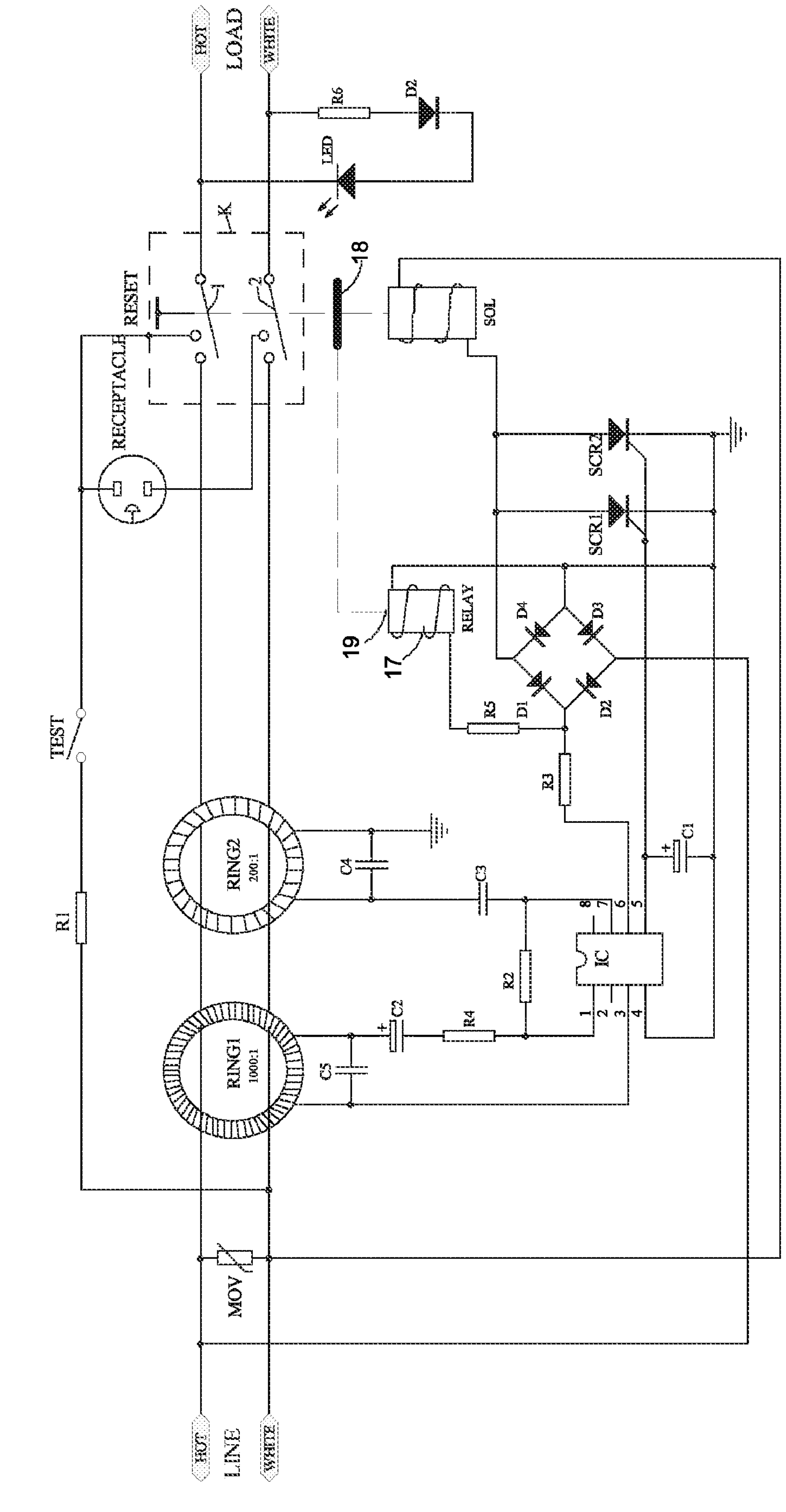
FIG. 9 is a circuit diagram of a GFCI receptacle according to an alternative embodiment of the present invention.
Figure 10:
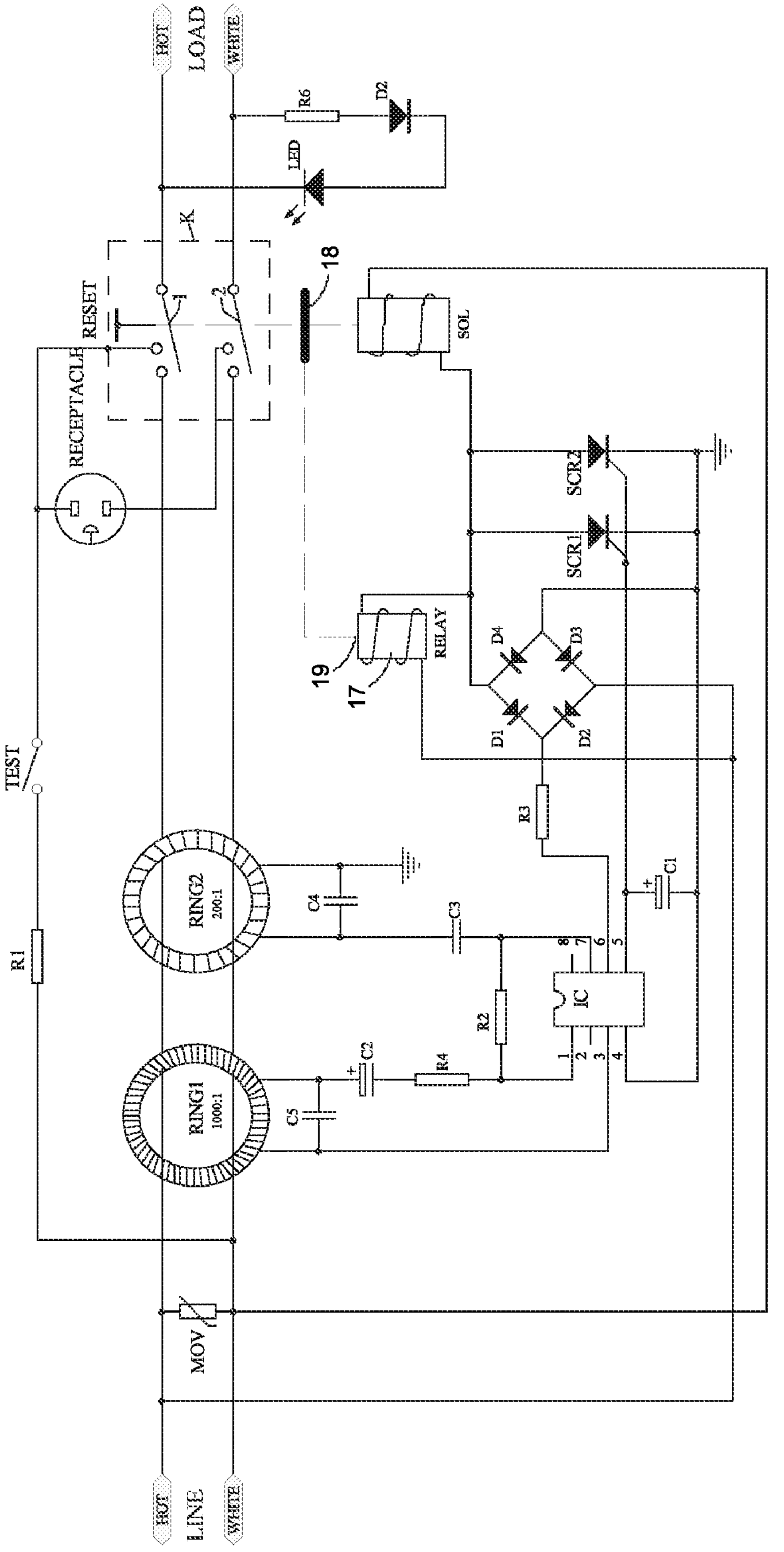
FIG. 10 is a circuit diagram of a GFCI receptacle according to another alternative embodiment of the present invention.

As shown in FIGS. 8, 9 and 10, the two ends of the relay coil 17 are connected to the DC output or AC input of a power supply circuit (the diode bridge) that supplies power to the GFCI control circuit. At least one end of the relay coil 17 is connected after the solenoid SOL (i.e. the disconnect coil 8). The solenoid is connected in series with the power supply circuit.

As shown in FIG. 8, the hot line (HOT) of the input side (LINE), a diode bridge rectifier circuit D1-D4, the solenoid SOL, and the neutral line (WHITE) of the input side (LINE) are connected in series to form the power supply circuit that supplies power to the GFCI control circuit. One end of the relay coil 17 is connected via a resistor R3 to the positive DC output of the diode bridge rectifier circuit D1-D4. The other end of the relay coil 17 is connected after the solenoid SOL to the input of the diode bridge rectifier circuit D1-D4 that is connected to the negative DC output of the diode bridge rectifier circuit D1-D4.

As shown in FIG. 9, the hot line (HOT) of the input side (LINE), a diode bridge rectifier circuit D1-D4, the solenoid SOL, and the neutral line (WHITE) of the input side (LINE) are connected in series to form the power supply circuit that supplies power to the GFCI control circuit. One end of the relay coil 17 is connected via a resistor R5 to the positive DC output of the diode bridge rectifier circuit D1-D4. The other end of the relay coil 17 is connected after the solenoid SOL to the negative DC output of the diode bridge rectifier circuit D1-D4.

As shown in FIG. 10, the hot line (HOT) of the input side (LINE), a diode bridge rectifier circuit D1-D4, the solenoid SOL, and the neutral line (WHITE) of the input side (LINE) are connected in series to form the power supply circuit that supplies power to the GFCI control circuit. One end of the relay coil 17 is connected to the input of the diode bridge rectifier circuit D1-D4 that is connected to the hot line (HOT) of the input side (LINE). The other end of the relay coil 17 is connected after the solenoid SOL to the input of the diode bridge rectifier circuit D1-D4 that is connected to the neutral line (WHITE) of the input side (LINE).

As shown in FIGS. 8, 9 and 10, when the solenoid SOL is not conductive due to an abnormal condition, the current path of the power supply circuit formed by the diode bridge rectifier circuit D1-D4 and the solenoid is broken. Thus, no voltage is applied on the relay 17, no current flows through the relay to generate a magnetic field, and the plunger 19 is not activated. As such, the moveable lock plate 18 is urged by the spring 29 to cover the hole 65 (shown in FIG. 7). When the hole 65 is covered, because the reset guiding member 37 cannot be pressed down sufficiently along the though hole 62 of the disconnecting member 12 to allow the groove 38 to engage the edge of the hole 61 of the L-shaped lock member 13, the reset guiding member 37 cannot bring the disconnecting member 12 upwards with it to make the contact between the moveable contact terminals 46, 45, 47, 44 and the stationary contact terminals 50, 51, 55, 56, respectively. In other words, the reset action cannot be performed. As a result, the input and output sides of the GFCI device cannot be electrically connected. Similarly, if during installation of the GFCI device the output side of the GFCI device is connected to the power lines by mistake (i.e. reverse wiring), such that the hot and neutral wires of the power lines from the wall are connected to terminals 24, 25 shown in FIGS. 8-10, no voltage is applied to the power supply circuit formed by the diode bridge rectifier circuit D1-D4. As a result, the plunger 19 in the relay coil 17 is not activated even when the solenoid is in a proper working condition, and the moveable lock plate 18 is urged by the spring 29 and continues to cover the hole 65. Thus, the reset action cannot be performed, and the input and output sides of the GFCI device cannot be electrically connected.

Figure 4:
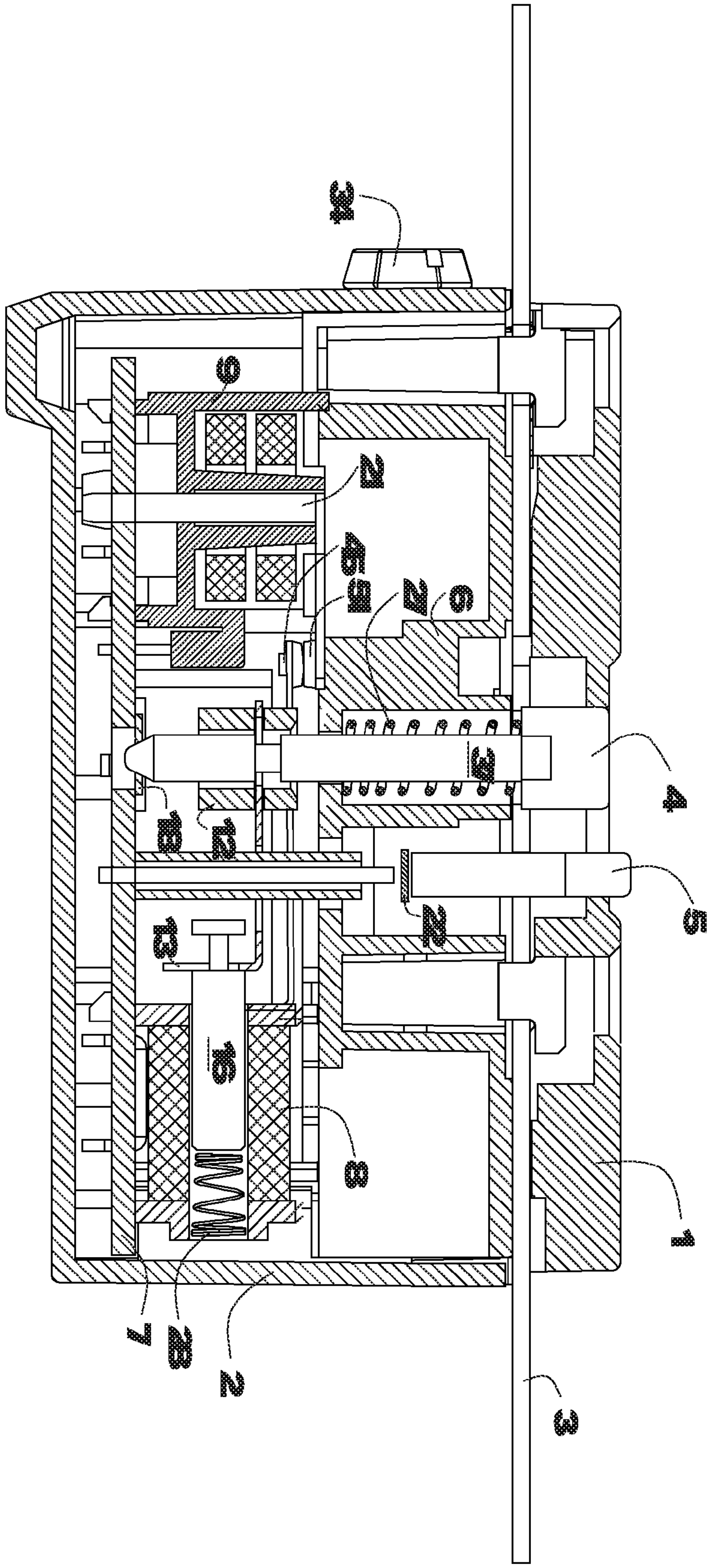
FIGS. 4 and 5 are cross-sectional views illustrating the GFCI receptacle in a proper working condition, where the input side and the output side are electrically connected.

During installation, when the power lines from the wall are correctly connected to the input side GFCI device, i.e., when the line side (LINE) terminals 23, 26 are connected to the hot and neutral wires of the power lines, electrical connection between the input and output sides of the GFCI device can be achieved as described below. As shown in FIGS. 8, 4 and 5, when the solenoid is in a proper working condition and the GFCI device is correctly connected to the power lines, a current flows in the power supply circuit from the hot line (HOT) of the input side (LINE) via the diode bridge rectifier circuit D1-D4 and the solenoid to the neutral line (WHITE) of the input side (LINE). The diode bridge rectifier circuit D1-D4 provides an output voltage, and the relay 17 is energized to generate a magnetic field. The plunger 19 is activated and moves the moveable lock plate 18 to expose the hole 65 under the reset guiding member 37. At this time, when the reset button 4 is pressed down, the reset guiding member 37 moves downwards in the though hole 62 of the disconnecting member 12, and the groove 38 on the reset guiding member 37 engages the edge of the hole 61 of the L-shaped lock member 13. When the reset button 4 is released, the reset guiding member 37 moves upward, bringing disconnecting member 12 upwards with it. The two side arms 53, 52 bring the moveable elastic output metal plates 14, 15 upwards. As a result, the moveable contact terminals 46, 45 come into contact with the stationary contact terminals 50, 51 connected to line side (LINE) terminals 23, 26, and the moveable contact terminals 47, 44 come into contact with the stationary contact terminals 55, 56 on the output conductors 10, 11. The input and output sides of the GFCI device are therefore connected, and power is available at the output side.

The GFCI device according to embodiments of the present invention has the following advantages.

First, because the moveable elastic output metal plates are used as the output conductor, and the movable contact terminals on the moveable contact arms are used to make electrical contact with the respective stationary contact terminals, the electrical contact is more reliable. Thus, the GFCI device according to embodiments of the present invention has a simple structure and is safe and reliable.

Second, the GFCI device according to embodiments of the present invention can prevent power output at the insertion outlets in the event of reverse wiring during installation and when the solenoid SOL is not functioning properly. The GFCI is provided with the relay coil and related components, where the relay coil is electrically connected to the output of the power supply circuit that supplies power to the GFCI control circuit, with the solenoid SOL connected in series in the power supply circuit. When the output side of the GFCI device is connected to the power lines by mistake, or when the solenoid SOL is burnt out (i.e. due to a large current caused by a short in the SCR or other components in the GFCI control circuit), the current path of the power supply circuit is broken, and now voltage is applied to the relay coil. As a result, the relay plunger is not activated, and the moveable lock plate 18 is urged by the spring 29 to cover the hole 65. The reset button cannot be pressed down to reset the device. Thus, the input side and output side of the GFCI device remain disconnected, preventing power from being output to the insertion outlet on the faceplate of the device.

It will be apparent to those skilled in the art that various modification and variations can be made in the GFCI device of the present invention without departing from the spirit or scope of the invention. Thus, it is intended that the present invention cover modifications and variations that come within the scope of the appended claims and their equivalents.

What is claimed is:

1. An improved ground-fault circuit interrupter (GFCJ) device, comprising:
- input conductors adapted to be electrically connected to hot and neutral power lines;
- output conductors adapted to be electrically connected to hot and neutral load lines;
- output metal plates adapted for receiving prongs of a plug;
- a disconnecting assembly for electrically connecting the input conductors to the output conductors and the output metal plates when in a connected state, and electrically disconnecting the input conductors from the output conductors and the output metal plates when in a disconnected state;
- a solenoid which, when triggered, causes the disconnecting assembly to move from the connected state to the disconnected state;
- a detector coil for detecting a leakage current on the input conductors;
- a control circuit electrically coupled to the detector coil and the solenoid for triggering the solenoid when a leakage current is detected;
- a power supply circuit connected in series with the solenoid between the input conductors;
- a relay connected to the power supply circuit, the relay being energized only when the power supply circuit has a current passing through it;
- a moveable lock plate coupled to the relay, the moveable lock plate being moveable between a locking position when the relay is not energized and an unlocking position when the relay is energized; and
- a reset mechanism coupled to the disconnecting assembly for resetting the GFCI device, the reset mechanism including a reset button and a vertically movable reset guiding member coupled to the reset button, wherein when the reset guiding member moves down and then up, it engages with the disconnecting assembly to cause the disconnecting assembly to be in the connected state,
- wherein the moveable lock plate prevents the reset guiding member from moving down when the moveable lock plate is in the locking position;
- a first pair of stationary contact terminals permanently electrically connected to the input conductors; and
- a first pair of moveable contact terminals permanently electrically connected to the output conductors,
- wherein the disconnecting assembly moves the first pair of moveable contact terminals to be in contact with the first pair of stationary contact terminals, respectively, in the connected state and moves the first pair of moveable contact terminals to break contact with the first pair of stationary contact terminals, respectively, in the disconnected state.

2. The improved GFCI device of claim 1, wherein the power supply circuit includes a diode bridge having two input points and two output points, and wherein the relay is connected between the two input points.

3. The improved GFCI device of claim 1, wherein the power supply circuit includes a diode bridge having two input points and two output points, and wherein the relay is connected between the two output points.

4. The improved GFCI device of claim 1, further comprising a circuit board, wherein at least some of the detector coil, solenoid, control circuit, power supply circuit, and relay are disposed on the circuit board, wherein the circuit board defines a hole located below the reset guiding member, wherein the reset guiding member extends through the hole when moved down, and wherein the moveable lock plate blocks the hole when the moveable lock plate is in the locking position and exposes the hole when the moveable lock plate is in the unlocking position.

5. The improved GFCI device of claim 1, further comprising:
- a second pair of stationary contact terminals electrically connected to the output metal plates; and
- a second pair of moveable contact terminals electrically connected to the output conductors,
- wherein the disconnecting assembly moves the second pair of moveable contact terminals to be in contact with the second pair of stationary contact terminals, respectively, in the connected state and moves the second pair of moveable contact terminals to break contact with the second pair of stationary contact terminals, respectively, in the disconnected state.

* * * * *